(12) United States Patent
Gerharter et al.

(10) Patent No.: US 7,242,845 B2
(45) Date of Patent: Jul. 10, 2007

(54) RECORDING ARRANGEMENT HAVING RECORDING CONTROL MEANS

(75) Inventors: Herbert Gerharter, Haus (AT);
Andras Kalmar, Rannersdorf (AT);
Michael Kandler, Vienna (AT); Adolf Proidl, Vienna (AT); Hannes Riedl, Vienna (AT); Franz Schuegerl, Guntramsdorf (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 1158 days.

(21) Appl. No.: 09/918,162

(22) Filed: Jul. 30, 2001

(65) Prior Publication Data

US 2002/0056108 A1    May 9, 2002

(30) Foreign Application Priority Data

Aug. 4, 2000    (EP) .................................. 00890243

(51) Int. Cl.
*H04N 5/91*    (2006.01)
(52) U.S. Cl. .......................................... 386/46; 386/83
(58) Field of Classification Search .................. 386/46, 386/83, 95; 725/58; 348/460
See application file for complete search history.

(56) References Cited

U.S. PATENT DOCUMENTS

| 4,864,429 | A | | 9/1989 | Eigeldinger et al. ........ 358/349 |
| 5,432,558 | A | * | 7/1995 | Kim ............................ 348/460 |
| 5,682,206 | A | * | 10/1997 | Wehmeyer et al. ........... 725/58 |
| 6,118,926 | A | * | 9/2000 | Kim et al. ..................... 386/83 |
| 6,311,011 | B1 | * | 10/2001 | Kuroda ........................ 386/46 |
| 2004/0175121 | A1 | * | 9/2004 | Ellis et al. ..................... 386/83 |

FOREIGN PATENT DOCUMENTS

EP    0765079 A2    9/1996

* cited by examiner

*Primary Examiner*—Huy Nguyen
(74) *Attorney, Agent, or Firm*—Paul Im

(57) ABSTRACT

A recording arrangement receives reception information including program, picture and/or sound information in a receiving channel of a television program. A detector detects the received program information which characterizes the start and end times of the television programs. A recorder is adapted to record the picture and/or sound information on a record carrier from a recording start time till a recording end time. A recording controller which, when a user of the recording arrangement has defined the recording start time and the receiving channel for a recording, is adapted to propose the end determined by the detector as the recording end time for the recording of the television program that can be received in the receiving channel.

14 Claims, 1 Drawing Sheet

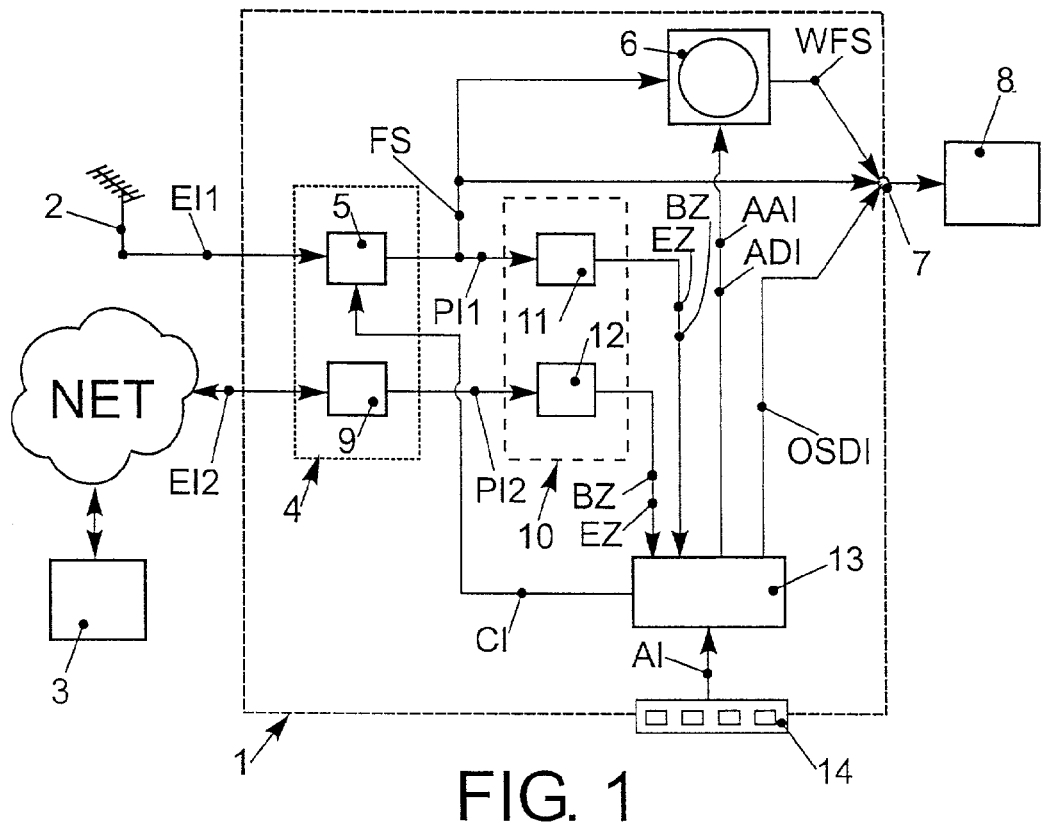
FIG. 1
| BZ / EZ | C1<br>CNN | C2<br>MTV | C3<br>EUROSPORT |
|---|---|---|---|
| ... | ... | ... | ... |
| 10:30 | EURO NEWS | CLIP | GP IN AUSTRIA |
| 11:00 | STOCK NEWS | STING | TENNIS |
| 11:30 | HEADLINES | IN | MARATHON |
| 12:00 | US SPECIAL | CONCERT | TENNIS |
| 12:30 | JERUSALEM | CLIP-NEW | ... |
| ... | ... | ... | |
FIG. 2
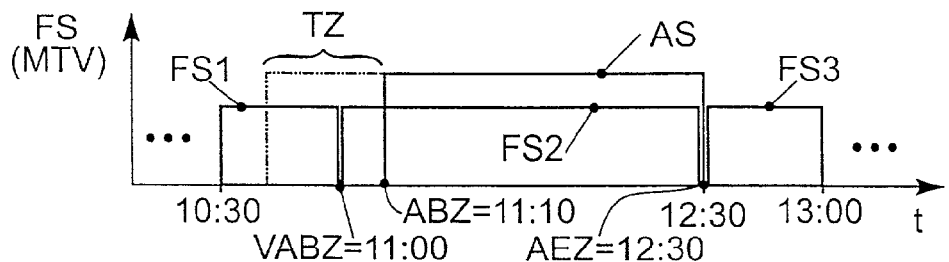
FIG. 3

RECORDING ARRANGEMENT HAVING RECORDING CONTROL MEANS

The invention relates to a recording arrangement having receiving means for receiving reception information including program information and, in at least one receiving channel, picture information and/or sound information of a television program, and having detection means for the detection of the received program information, which characterizes the start times and end times of television programs that can be received in the receiving channels, and having recording means, which are adapted to record the picture information and/or sound information received in the receiving channel on a record carrier from a recording start time till a recording end time.

The invention further relates to a recording method having the following method steps: receiving reception information including program information and, in at least one receiving channel, picture information and/or sound information of a television program, and detecting the received program information, which characterizes the start times and end times of television programs that can be received in the receiving channels, and recording the picture information and/or sound information received in the receiving channel on a record carrier from a recording start time till a recording end time.

Such a recording arrangement and such a recording method are known from the document U.S. Pat. No. 4,864,429. The known recording arrangement takes the form of a video recorder and includes a tuner for receiving picture information and sound information of a television program. The known video recorder further includes a VPS decoder, which forms a detection means and which detects VPS information contained in the received reception information for the television program. The detected VPS information inter alia includes a VPS code, which characterizes the television program currently received by the video recorder.

By actuating a Quick Start key a user of the known video recorder can activate a recording mode of the video recorder, in which mode the currently received television program is recorded. For this purpose, recording control means of the video recorder store the VPS code received at the instant of activation of the recording mode and constantly compare this code with the VPS code received during recording of the television program. When the received television program ends and a new television program is received in the reception information by the video recorder, the VPS code characterizing the television program also changes and the recording control means deactivate the recording mode.

It has been found that in the case of a minor disturbance in the reception of the reception information the VPS decoder cannot detect VPS information, although the received picture information and sound information can still be recorded by the video recorder or reproduced by a television set substantially without any disturbances. Thus, the known recording arrangement has the disadvantage that in the case of a minor disturbance in the reception of the reception information after actuation of the Quick Start key the recording control means either stop the recording mode immediately because the detected VPS code changes constantly or do not stop this recording mode because no VPS code can be detected. Likewise, the recording control means interrupt the recording mode in the case of a brief disturbance in the reception of the reception information, which is a disadvantage.

It has proved to be a further disadvantage of the known recording arrangement that the recording control means can use this method of controlling the recording mode only in the case of television stations which actually transmit VPS information in the reception information of the television programs. It has proved to be a further disadvantage that the user cannot influence the recording end time, which is defined automatically by the recording arrangement and which is not discernible to the user.

It is an object of the invention to provide a recording arrangement of the type defined in the first paragraph and a recording method of the type defined in the second paragraph, which preclude the aforementioned disadvantages. In such a recording arrangement this object is achieved by the provision of detection means for the detection of the received program information, which characterizes the start times and end times of television programs that can be received in the receiving channels, and by the provision of recording control means which, when a user of the recording arrangement has defined the recording start time and the receiving channel for a recording, are adapted to propose the end time determined by the detection means as the recording end time for the recording of the television program that can be received in the receiving channel.

Said object is achieved for such a recording method by the provision of the following method steps: detecting the received program information, which characterizes the start times and end times of television programs that can be received in the receiving channels, and proposing the end time determined by the detection means as the recording end time for the recording of a television program that can be received in the receiving channel when a user of a recording arrangement that carries out the recording method has defined the recording start time and the receiving channel for the recording.

This has the advantage that the recording arrangement proposes a recording end time to the user, which after confirmation by the user causes the picture information and sound information to be recorded till the end of the television program, which is quite likely to comply with the user's wish. However, the user has the possibility to change the proposed recording end time in accordance with his wish.

Advantageously, the reception information that can be received by the receiving means from the internet or in hidden lines of the television signal in the usual manner includes the program information of practically any television program that can be received within the coming days and is consequently not restricted to television programs for which also VPS information can be received. Since the detection means can already detect the received program information for television programs that cannot be received until the next day, a disturbance in the reception of the reception information before or during the recording of the picture information and/or the sound information will no longer affect the reliable detection of the recording end time to be proposed.

A further advantage that also in the case that the recording of the currently received television program is activated by the user the recording control means propose the end time of this television program as the recording end time and a very simple and quick method of programming the recording arrangement is obtained.

An additional advantage is that the recording control means propose the end time of the next television program as the recording end time when, as is unlikely to be desired by the user, the recording time is very short (for example, a recording time of only 1.5 minutes). This is particularly advantageous when the user has already activated the recording mode briefly before the beginning of the television program to be recorded.

Yet a further advantage is that the recording end time is defined in accordance with selection information entered by the user with the aid of a remote control or keys of the recording arrangement.

Another advantage is that it is possible to detect program information, which is already transmitted in many European countries, in hidden lines of the television signal in accordance with the standard ETS 300 701 or in a DVB data stream in accordance with the standard EN 300 468 V1.3.1 (1998-02).

A further advantage is that it is also possible to detect program information stored on an EPG server connected to the Internet.

A recording arrangement and a recording method have the advantage that, also when the user activates the recording mode after the start time of a television program, the beginning of the television program stored in the intermediate storage means is allocated to the recording and the complete recorded television program is reproduced during a subsequent playback.

The invention will now be described, by way of example, with reference to an embodiment which is shown in the Figures but to which the invention is not limited.

FIG. 1 shows a hard disk recorder which suggests to the user that the end time of a television program to be recorded and determined by means of an electronic program guide is used as the recording end time.

FIG. 2 shows a part of the electronic program guide received by the hard-disk recorder shown in FIG. 1.

FIG. 3 symbolically shows the waveform of the television signal of television programs of the television station MTV, which are received in a receiving channel of the hard-disk recorder.

FIG. 1 shows a hard-disk recorder 1 which forms a recording arrangement for recording the picture information and the sound information of a television signal FS. For this purpose, the hard-disk recorder 1 carries out a recording method. The hard-disk recorder 1 can receive reception information EI1 in the form of an antenna signal from an antenna 2. In a plurality of frequency bands or receiving channels C the antenna signal contains television signals FS representing the picture information and sound information of television programs from television stations. As is shown in a table T in FIG. 2, the hard-disk recorder 1 receives television programs from the television station CNN in a first receiving channel C1, television programs from the television station MTV in a second receiving channel C2 and television programs from the television station EUROSPORT in a third receiving channel C3.

In addition to the picture information and sound information of a television program the individual television stations also transmit teletext information in hidden lines of the television signal FS. A standard ETS 300 707 defines an electronic program guide containing first program information PI1, which is likewise transmitted in hidden lines of the television signal FS. This first program information PI1 inter alia includes the data of broadcasting of the television programs that can be received in the coming week, the receiving channel C in which these television programs can be received, as well as the start times BZ and the end times EZ of the these television programs.

The hard-disk recorder can retrieve second program information PI2 via the Internet, which information is stored on an EPG server 3 connected to the Internet. The second program information PI2 inter alia also includes the date of broadcasting of television programs that can be received in the coming week, the receiving channel C in which these television programs can be received, as well as the start times BZ and the end times EZ of the these television programs. The table shown in FIG. 2 contains a part of the second program information PI2 stored on the EPG server 3 and shows the start times BZ, the end times EZ and the titles of the television programs which are broadcast by the television stations CNN, MTV and EUROSPORT in the period from 10:30 hours until 13:00 hours.

FIG. 3 symbolically shows the waveform of the television signal FS(MTV) of television programs of the television station MTV, which are received in the second receiving channel C2. A first television program FS1 entitled "CLIP" starts at 10:30 hours and ends at 11:00 hours. Thereupon, a second television program FS2 entitled "STING IN CONCERT" starts at 11:00 hours and ends at 12:30 hours. Subsequently, a third television program FS3 entitled "CLIP-NEW" starts at 12:30 and ends at 13:00 hours.

The hard-disk recorder 1 has receiving means 4 for receiving the first reception information EI1 and for retrieving the second program information PI2 from the EPG server 3 as second reception information EI2. For this purpose, the receiving means 4 include a tuner 5, to which the first reception information EI1 from the antenna 2 and receiving channel information CI can be applied. In accordance with the receiving information CI applied to the tuner 5 the tuner selects one of the receiving channels C that can be received and supplies the television signal FS received in the selected receiving channel C to recording means 6 and an output terminal 7.

The recording means 6 include a signal processing stage for processing the received television signal FS and a hard disk for recording the processed television signal. The recording means 6 can receive recording activation information AAI, by means of which a recording mode of the hard-disk recorder 1 is activated at a recording start time ABZ. The recording means 6 can further receive recording deactivation information ADI, by means of which the recording mode of the hard-disk recorder 1 is deactivated or terminated at a recording end time AEZ. Thus, the processed television signal supplied by the tuner 5 is recorded by the hard disk of the recording means 6 from the recording start time ABZ till the recording end time AEZ.

In a reproducing mode of the hard-disk recorder 1 the recording means 6 also form reproducing means by which a processed television signal recorded on the hard disk can be reproduced as a reproduced television signal WFS and can be applied to the output terminal 7. The output terminal 7 is connected to a television set 8 by means of which a user of the hard-disk recorder 1 can view and hear the television programs supplied to the output terminal 7 as the television signal FS or WFS.

The receiving means 4 further include a modem 9 by means of which a communication connection to the Internet NET and, in the end, to the EPG server 3 can be established via a service provider, not shown in FIG. 1. For this purpose, the modem 9 stores the IP address of the EPG server and, if desired, also IP addresses of similar other EPG servers. After the communication connection with the EPG server 3 has been established the modem 9 is adapted to retrieve the second program information PI2 as the second reception information EI2.

The hard-disk recorder 1 further includes detection means 10 adapted to detect first program information PI1 supplied by the tuner 5 and second program information PI2 supplied by the modem 9. During the detection the detection means 10 determine the start times BZ and the end times EZ contained in the program information PI1 and PI2 as well as the date of the television programs FS that can be received via the individual receiving channels C by the tuner 5 within the coming week.

To detect the received first program information PI1 contained in the hidden lines of the television signal FS the detection means 10 include a teletext decoder 11. How particular information (for example BZ, EZ) can be derived from a data stream that complies with a standard (ETS 300 707) is known to those skilled in the art. For the detection of the second program information TI2 stored on the EPG server 3 the detection means 10 include a detection stage 12. The start times BZ, end times EZ, the broadcast date of the relevant television programs and the receiving channel C in which the television programs can be received determined by threshold teletext decoder 11 and the detection stage 12 can be supplied to recording control means 13 of the hard-disk recorder 1.

The recording control means 13 are adapted to store the information applied to it in the table T shown in FIG. 2. The recording control means 13 are further adapted to supply the recording activation information AAI and the recording deactivation information ADI to the recording means 6 and thus to control the recording means 6. The recording control means 13 are further adapted to supply the receiving channel information CI to the tuner 5 and thus to define the receiving channel C whose television signal FS is supplied by the tuner 5.

Selection information AI can be applied from a keypad 14 to the recording control means 13, by means of which the user of the hard-disk recorder 1 can control the hard-disk recorder 1 and can thus also program this recorder for the recording of a television program. Depending on the instantaneous mode of operation of the hard-disk recorder 1 the recording control means 13 can supply on-screen display information OSDI to the television set 8 via the output terminal 7 and display this information as on-screen display with the aid of this television set.

When the user of the hard-disk recorder 1 has defined the recording start time ABZ and the receiving channel C for a recording the recording control means 13 are now adapted to propose the end time EZ, determined by the detection means 10, for the television program that can be received in the receiving channel C at the recording start time ABZ as the recording end time AEZ of the recording. The advantages of this will be elaborated on with the aid of two examples of use given hereinafter.

In the first example of use of the hard-disk recorder 1 it is assumed that the user of the hard-disk recorder 1 turns on the television set 8 at 11.08 hours and sees the television program "STING IN CONCERT" received in the currently selected receiving channel C2 of the television station MTV. At 11:10 hours the user decides to record this television program, received in the selected receiving channel C2, by means of the hard-disk recorder 1 starting at the current time and actuates a One Touch Recording key of the keypad 14. Subsequently, the keypad 14 selection information AI corresponding to the One Touch Recording key is applied to the recording control means 13, thereby defining the recording start time ABZ and the receiving channel C for the recording.

Subsequently, the recording control means 13 immediately supply the recording activation information AAI to the recording means 6. As a result of this, the second television signal FS2 of the television program "STING IN CON-CERT" is recorded as the recording signal AS starting at the recording start time ABZ=11:10 hours, as is illustrated in FIG. 3.

The recording control means 13 now read the stored table T and supply on-screen display information ODSI to the television set 8, which produces an on-screen display of the text "The television program being recorded entitled "STING IN CONCERT" ends at 12:30 p.m. Would you like to stop this recording at 12:30 p.m. (Press "OK") or to define another recording end time? (Press "BACK")". As a rule, the user will wish to record the current television program by the actuation of the One Touch Recording key and will therefore corroborate this by the actuation of an OK key of the keypad 14.

This has the advantage that the user immediately receives information about the length of the currently recorded television program and can very simply define the recording end time AEZ required for the recording of this television program, which is effected by a single actuation of the OK key.

This is advantageous, particularly in comparison with the now customary functionality of the One Touch Recording key, where the recording end time AEZ must be incremented by the user in 30 minute steps by repeated actuation of a length key until a recording length is obtained which is envisaged to be adequate for recording the entire television program.

When the user wishes to record more than just the current television program he can define an end time EZ of the television program following the current television program as the recording end time AEZ by the actuation of an ADD key. In the first example of use the user could thus set the recording end time AEZ to 13:00 hours by a single actuation of the ADD key, as a result of which the third television signal FS3 of the entire television program "CLIP-NEW" would also be recorded. An appropriate confirmative text "The recording end time has been set to 13:00 hours and the television programs "STING IN CONCERT" and "CLIP-NEW" will be recorded" would be shown as an on-screen display on the television set 8.

This has the advantage that a particularly simple method of defining the recording end times AEZ for the recording of television programs until they have ended is obtained. In addition, the advantage is obtained that a brief or even a longer disturbance in the antenna signal, which occurs before or during the recording and which prevents the reception or the correct detection of the first program information PI1 but which hardly affects the picture information and sound information, does not affect the reliable completion of the recording at the end time of the recorded television program.

The recording control means 13 are, in addition, adapted to calculate the recording length of a recording, which can be determined from the recording start time ABZ and the end time EZ of the television program received at the recording start time ABZ. The recording control means 13 are then adapted to propose the end time EZ, determined by the detection means 11, of the television program which directly follows the television program received in the selected receiving channel C at the recording start time ABZ as the recording end time AEZ of the recording if the recording start time ABZ and the end time EZ of the television program received at the recording start time ABZ do not yield at least a minimum recording length of three minutes for the recording.

Thus, when at 10:58 hours the user actuates the One Touch Recording key in order to record the television program "STING IN CONCERT", of which he knows that it starts at 11:00 hours, the recording control means 11 do not propose the recording end time AEZ=11:00 hours but directly propose the recording end time AEZ=12:30 hours. This has the advantage that each time the recording end time is proposed which is most likely to be required by the user.

It is particularly advantageous that the first program information PI1 can be obtained from the hidden lines of the television signal FS and the second program information PI2 can be downloaded from EPG servers connected to the Internet. Thus, when the program information of a television signal FS transmitted via a receiving channel C cannot be found in the first program information PI1 or the second program information PI2 it is possible to search for it in the second program information PI2 or the first program information PI1, respectively.

A part of the hard disk of the recording means 6 now in addition forms intermediate storage means, by which the instantaneously last 30 minutes of the television signal FS supplied by the tuner are recorded in a continually overwriting fashion. If within this intermediate storage time TZ=30 minutes the One Touch Recording key is actuated in order to start the recording of the currently received television program, the recording control means 13 will assign the television signal FS of the first part of the television program already recorded in the intermediate storage means to the recorded television signal FS of the subsequent recording. Thus, the recording start time ABZ of 11:10 hours is afterwards moved to an earlier recording start time VABZ=11:00 hours.

This has the advantage that even when the user only activates the recording of the television program "STING IN CONCERT" at 11:10 hours the first part of this television program already recorded by means of the intermediate storage means is assigned to the subsequent part of the recording and during a subsequently reproduction the entire television program "STING IN CONCERT" can be reproduced.

In a second example of use of the hard-disk recorder 1 the user wishes to record the television program "MARATHON" by means of the hard-disk recorder 1, which can be received next day from 12:00 hours till 12:30 hours via the receiving channel C3 of the television station EUROSPORT. For this purpose, the user activates a timer mode of the hard-disk recorder 1 by the actuation of a timer key, upon which the television set 8 shows an on-screen display in which the user can enter the date of the recording, the receiving channel C, the recording start time ABZ and the recording end time AEZ by means of the keys of the keypad 14.

Subsequently, the user for the time being enters the date of the recording, the receiving channel C and the recording start time ABZ of the recording to be programmed, upon which the recording control means 13 determine the recording end time AEZ=12:30 hours with the aid of the table T and propose this in the on-screen display. This has the advantage that the user merely has to corroborate the correctness of all the entries and the proposal by a single actuation of the OK key and entry of the recording end time AEZ by means of keys of the keypad 14 is not necessary.

It is to be noted that the receiving means of a recording apparatus may also be adapted to receive television programs in a digital data stream (DVB data stream includes MPEG transport stream). It is then particularly advantageous when the detection means are adapted to detect a digital data stream in accordance with the EN 300 468 V1.3.1 (1998-02) standard, which stream may also include an electronic program guide.

It is to be noted that the first program information PI1 and the second program information PI2 may be detected and the detected information may be entered into the table T a few days up to a week in advance. Said detection may also be effected, for example, at night when the user does not utilize the hard-disk recorder and there is less data transfer traffic over the Internet NET via the service provider.

It is to be noted that the program information of an electronic program guide can also be received by the recording arrangement via other communication paths. It would be possible, for example, to receive the program information via a wireless local area network, for example as laid down in the Bluetooth standard.

It is to be noted that a recording arrangement in accordance with the invention may also take the form of, for example, a DVD recorder, an analog video recorder or a computer.

The invention claimed is:

1. A recording arrangement comprising:
   receiving means for receiving reception information including program information and, in a receiving channel, picture information and/or sound information of a television program;
   detection means for the detection of the received program information, which characterizes start times and end times of television programs that are received in the receiving channel;
   recording means, which are adapted to record the picture information and/or the sound information received in the receiving channel on a record carrier from a recording start time till a recording end time; and
   recording control means which, when a user of the recording arrangement has defined the recording start time and the receiving channel for a recording, are adapted to propose to the user the recording end time determined by the detection means for the recording of the television program that is received in the receiving channel.

2. The recording arrangement as claimed in claim 1, in which the recording control means, when the user of the recording arrangement has defined a current time as the recording start time and the receiving channel currently selected for the recording at the receiving means, are adapted to propose the recording end time for the recording of the television program received in the receiving channel currently selected at the receiving means.

3. The recording arrangement as claimed in claim 1, in which the recording control means are adapted to propose to the user a further recording end time of a further television program which directly follows the television program received in the selected receiving channel at the recording start time if the recording start time and a program end time of the television program received at the recording start time do not yield at least a minimum recording length of the recording.

4. The recording arrangement as claimed in claim 1, further comprising change means adapted to change the proposed recording end time in accordance with selection information entered by the user of the recording arrangement.

5. The recording arrangement as claimed in claim 1, wherein the detection means are adapted to detect an electronic program guide contained in the reception information.

6. The recording arrangement as claimed in claim 1, wherein the receiving means are adapted to receive the program information from the Internet.

7. The recording arrangement as claimed in claim 1, further comprising intermediate storage means for recording in a continually overwriting fashion the picture information and/or the sound information of a last received television program in the receiving channel during an intermediate storage time, wherein the recording control means are adapted to assign the last received television program recorded in the intermediate storage means during the intermediate storage time to a current television program currently being recorded, if the recording start time does not correspond to a start time of the current television program.

8. A recording method comprising the acts:
   receiving reception information including program information and, in a receiving channel, picture information and/or sound information of a television program;
   detecting by a detector the received program information, which characterizes start times and end times of television programs that are received in the receiving channel, and
   recording the picture information and/or the sound information received in the receiving channel on a record carrier from a recording start time till a recording end time, and
   proposing to the user the recording end time determined by the detector from the received program information when a user defines the recording start time.

9. The recording method as claimed in claim 8, further comprising the act of:
   proposing to the user the recording end time when the user defines a current time as the recording start time.

10. The recording method as claimed in claim 8, further comprising the act of:
    proposing to the user a further recording end time of a further television program which directly follows the television program received in the receiving channel at the recording start time if the recording start time and a program end time of the television program received at the recording start time do not yield at least a minimum recording length of the recording.

11. The recording method as claimed in claim 8, further comprising the acts of:
    recording in a continually overwriting fashion the picture information and/or the sound information of a last received television program in the receiving channel during an intermediate storage time, and
    assigning the last received television program recorded during the recording time to a current television program currently being recorded, if the recording start time does not correspond to a start time of the current television program.

12. A recording system comprising:
    a receiver configured to receive program information including at least one of receiving channels, picture information and/or sound information of a television program;
    a detector configured to detect the received program information, which characterizes start times and end times of programs that are received in the at least one of the receiving channels;
    a recording adapted to record the picture information and/or the sound information received in the at least one of the receiving channels on a record carrier from a recording start time till a recording end time; and
    a controller which, when a user of the recording system has defined the recording start time and a receiving channel for a recording, is configured to propose to the user the recording end time determined by the detector for the recording of said television program received in the at least one of the receiving channels.

13. The recording system of claim 12, wherein said controller is further configured to propose a further end time of a further program that follows a current program when a difference between a current time and a current end time of said current program is below a predetermined threshold.

14. The recording system of claim 12, wherein said controller is further configured to continually record programs for storage in a first memory, and store a selected program in a second memory starting from a beginning of said selected program already stored in said first memory when a recording start time of said selected program does not correspond to a starting time of said selected program.

* * * * *